Oct. 6, 1959  M. NAZZEWSKI  2,907,933
ELECTROLYTIC CAPACITOR ENDSEAL
Filed Feb. 21, 1955

MATHEW NAZZEWSKI
INVENTOR.

BY
HIS ATTORNEYS

United States Patent Office 2,907,933
Patented Oct. 6, 1959

2,907,933

ELECTROLYTIC CAPACITOR ENDSEAL

Mathew Nazzewski, Adams, Mass., assignor to Sprague Electric Company, North Adams, Mass., a corporation of Massachusetts Application February 21, 1955, Serial No. 489,390

3 Claims. (Cl. 317—230)

This invention relates to electrolytic devices and more particularly to endseal constructions for hermetically sealed electrolytic capacitors, in which a novel glass-to-metal seal is featured.

Electrolytic devices such as capacitors ordinarily comprise a container within which the electrical device is disposed; the container serves to retain the electrolyte required for operation of the device. The electrolyte is ordinarily either a liquid or viscous paste, and usually of a corrosive nature. Thus air and liquid tight sealing of the device is of primary importance, not only to forestall spilling of the electrolyte, but also to prevent the creepage of the electrolyte along the boundaries between differing materials that jointly serve as sealing means. Leakage of the electrolyte has become increasingly important with miniature and subminiature electrolytic constructions wherein only a limited amount of electrolyte is utilized; hence the loss of even a minor amount of electrolyte is the loss of a substantial part of the available electrolyte, thereby resulting in breakdown or electrical deterioration of the device. Loss of electrolyte in electrolytic capacitors has continued to be an extremely vexing problem for the electronic requirements are such that operation is at much higher temperatures than hitherto thought possible, for example, 100 to 200 degrees C. and higher. Numerous attempts are set forth in the literature seeking to resolve this problem, e.g., a synthetic resin seal singly or in combination with gaskets. One such seal is shown in U.S. Letters Patent 2,617,863, to G. H. Stinson, wherein the capacitor is sealed by a metallic cover imposed onto the open end of a metallic container and isolated electrically therefrom by means of a polytetrafluoroethylene or other similar resinous gasket. Even though this resinous member is crimped under pressure in such an assembly, the electrolyte continues to creep along the resinous surface resulting in substantial loss of electrolyte, particularly at extended operations at temperatures of 100° C. or higher. Such failure of resins to fully seal also appears in other cases, e.g. a multi-layer resinous end seal having a crimped polytetrafluoroethylene resin gasket with its exposed surface covered with a layer of a thermoset epoxyline resin. The failure is readily traced to the phenomena of continued cold flow of the resin as long as it is maintained under stress.

It is therefore an object of this invention to overcome the foregoing and related disadvantages of the art. It is a further object of this invention to produce a glass-to-metal hermetic seal suitable for enclosure of electrolytic devices. It is a still further object of this invention to produce a tantalum capacitor having a glass-to-metal seal suitable for extended operation at temperatures of 100° C. and higher with no loss of electrolyte and of surprisingly low leakage currents. Further objects of this invention will be apparent from the following description, as well as the appended claims.

In its broadest scope, the objects set forth are achieved in accordance with this invention by the production of an electrolytic device having a valve metal terminal lead joined to the end of an elongated non-valve metal terminal, and a vitreous plug fused entirely around said terminal end and around said joint, said vitreous plug having substantially the same temperature coefficient of expansion as said non-valve metal terminal.

In a more limited sense the objects set forth are achieved in accordance with this invention by the fabrication of a glass-to-metal hermetic seal for electrolytic devices which comprises a metal wall having an opening therethrough, a metal ring bonded to the wall all around the opening and extending inwardly therefrom, an external lead, an internal lead having one end adherently joined to one end of the external lead, the joint being located within but spaced from said ring, and a glass plug fused to the ring and leads as well as entirely around them and around said joint, the plug having a thermal coefficient of expansion substantially the same as the ring and external lead, but substantially different from the wall and the internal lead.

In a further limited sense the objects of this invention have been achieved through the production of a hermetically sealed tantalum capacitor comprising a filmed tantalum anode fully immersed in an electrolyte confined in a container having a flanged annular cover member bonded thereto, a ring member bonded all around the inner edge of said cover member, an external lead, an internal lead having one end bonded to an end of the external lead, said tantalum anode electrically connected to said internal lead; and a glass plug fused to and fully enclosing said ring member, the junction region between said external lead and said internal lead, and the inner-peripheral section of said flanged annular cover member.

This invention is particularly featured by a ring member which is fully embedded in a vitreous member with said ring member and said vitreous member having substantially the same temperature coefficients of expansion.

Referring now to the drawings which form a part of the specification:

Figure 3:
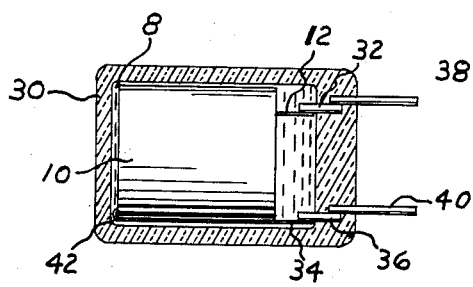
Fig. 3 is a cross-sectional view of a modified electrolytic capacitor embodying the invention.

In addition to electrolyte leakage, which is in itself a most vexing problem with hermetically sealed electrolytic devices, there is a further substantial problem somewhat specific with electrolytic capacitors, particularly tantalum and aluminum, of securing a seal about the end of the internal lead wire. This is necessary with constructions using a non-valve metal external lead wire so as to prevent electrolytic action, which manifests itself in excessive leakage currents followed by inoperability of the apparatus. Attempts to avoid this problem by extending the valve metal as the lead wire completely through the seal have not been successful, because the temperature coefficients of expansion of the seal and the valve metal lead wire are so different as to permit substantial leakage of the electrolyte through the seal. With my invention these difficulties have been overcome by using as the external lead connection for the electrolytic capacitor a composite assembly consisting of an internal and an external element lap-bonded together, the former of a valve metal and the latter of a metal having substantially the same temperature coefficient of expansion as a vitreous plug, in which the lap-bonded portion of the internal and external lead wires is embedded. At first it is thought that there would be substantial leakage of electrolyte along the valve metal surface into the vitreous plug until the electrolyte reached the non-valve portion of the lead conductor, with resulting corrosion and greatly increased leakage current. Although penetration of the electrolyte along the valve metal may continue until it reaches the junction with the external lead wire, the electrolyte film is so thin and apparently of such high resistance that there is no detectable change in leakage current when operated for extended periods at operating temperatures above 100° C. On the other hand a serious increase in leakage current is produced if the non-valve metal is directly exposed to the main body of electrolyte. This construction serves as an excellent glass-to-metal seal for vitreous encased electrolytic devices. However, there is a great need for a hermetic seal for those devices which are enclosed in a metallic container. This glass-to-metal seal of the terminal leads is adapted for use with a metallic container by incorporation of a ring member, again of the metal having substantially the same temperature coefficient as the vitreous plug, and bonded around a lead-through opening in a metal wall which can be part of, or subsequently used to cover, a container.

The container metal should be non-corrosive in the electrolyte and may be a valve metal. The valve metals include aluminum, tantalum, zirconium and others well known to the art. A metal non-corrosive to electrolytes does not dissolve either chemically or electrolytically in the particular electrolyte used for the operation of the device. Non-corrosive metals include the noble metals such as silver, gold, platinum, etc. as well as alloys thereof; also chromium, and stainless steel are representative of those useful for less-corrosive electrolytic systems.

Through bonding of the ring member intimately to the annular cover member container wall and all around the opening, therethrough, the movement of the electrolyte along the cover member is stopped at the point where it reaches the junction between the ring member and the annular cover. Thus, as long as the external lead and the ring member are chosen so as to have substantially the same temperature coefficient, as the vitreous plug, the electrolytic device is truly hermetically sealed, and hence operable at elevated temperatures, limited only by mechanical resistance to internally generated pressures.

Figures 1, 2:
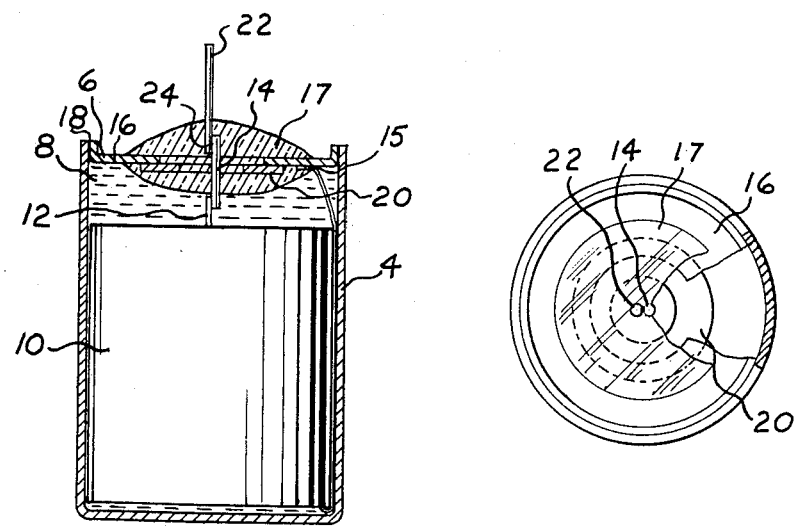
Fig. 1 is a cross-sectional view of an electrolytic capacitor embodying my invention.
Fig. 2 is a partly broken away plan view of the electrolytic capacitor of Fig. 1.

My invention will now be illustrated in connection with the electrolytic capacitor shown in Fig. 1, which utilizes a cylindrical container 4 of valve metal, silver, or other non-corrosive metal as the cathode. The container 4 is provided with a cover 6, more fully described hereafter as the novel vitreous glass-to-metal seal of the invention, so as to contain a suitable electrolyte 8 in which is fully immersed a capacitor assembly 10. The capacitor assembly 10 may be of any of the well-known types, such as a convolutely wound foil structure, the porous sintered pellet type, as well as the miniature etched or plain anode wire construction. The anode material is of a valve forming metal, such as aluminum, tantalum, zirconium and others well known to the art, which is formed with an oxide film, the thickness of which is dictated by the voltage application to which the capacitor is to be exposed. With the foil type construction, the anode foil is convolutely wound with a cathode foil and the electrodes are separated by a porous spacer, such as paper, resin, glass cloth, etc. The electrolyte 8, particularly when used with the tantalum type capacitor, is extremely corrosive, and for high temperature applications can be an aqueous solution of sulphuric acid, e.g., 50% by weight. The anode tab 12 extends from the capacitor section 10 and is electrically and mechanically joined to the internal lead 14 which projects into the vitreous member 17, the latter preferably of a glass. Both the anode tab 12 and the internal lead wire 14 are of a valve metal so that a substantial oxide coating can be imposed upon their surfaces, thus avoiding high leakage currents. Where desired the anode tab 12 and the internal lead wire 14 can be a continuous length of conductor avoiding the weld of the two. The cathode is connected at 15 to the container 4 by a similar tab and internal lead wire. The flanged annular cover member 16 is bonded to the container 4 at 18 by techniques well known in the art, such as fusion welding, brazing, cold welding, etc.

The flanged end of the cover member 16 can be of any material from which the container 4 is made, but not of a material which would be easily corroded by the electrolyte 8. Flanged annular cover member 16 extends into the vitreous member 17 a substantial distance, with the terminal portion bonded to the ring member 20. Satisfactory bonding of the ring member 20 to the annular cover member 16 is obtained by welding or brazing to produce a continuous bonding of the ring member 20 to the member 16 in a path which encircles the center opening of the member 20. By means of this bonding, the leakage creep path of the electrolyte is prevented from continuing along the face of the annular cover member 16 to the exterior surface. The ring member 20 is of a metal having substantially the same temperature coefficient of expansion as the vitreous plug 17, and for convenience can be of the same material as the external lead 22. For the hard glasses, generally boro silicates, with silica content of 72% and upward and a working range from 1000 to 1300° C., suitable metals for ring 20 and lead 22 include tungsten, molybdenum or Kovar (trade name for an alloy consisting of 54% iron, 28% nickel, 18% cobalt). For the soft glasses, that is those soda-potash-lead and soda-potash-lime glasses having silica content of from 57 to 72% and a working range of roughly 800 to 1000° C., suitable metals include chrome-iron, cold rolled steel, platinum, and copper sheathed nickel-iron alloys. Also copper can be used reasonably well with both the hard and soft types. The external lead 22 is both electrically and mechanically joined to the internal lead 14 at 24, which junction is embedded well within the vitreous plug 17. In operation when the electrolyte creeps along the internal lead wire 14 until it reaches the junction 24, the conduction characteristics of this creep path are so poor as to produce no increase in leakage current of the apparatus, which is in itself of an unexpected nature. The member 20 can be either inward of the member 16 as shown in Fig. 1, or positioned exterior of member 16 as desired.

In the modification of Fig. 3 the capacitor assembly is completely enclosed, this time not in a metal container which functions as the cathode, but in a vitreous container 30. By bringing both the anode and cathode connections through the vitreous container 30 by the inner and external lead combination of Fig. 1, ring member 20 may be omitted. In Fig. 3 the capacitor 10 has its anode tabe 12 connected to the anode internal lead 32 and the cathode tab 34 connected to the inner cathode lead 36. The internal anode lead 32 is bonded to its external lead 38, the inner cathode lead 36, to the external cathode lead 40. The electrolyte 8 is easily introduced into the capacitor assembly prior to sealing off the base of the vitreous container 30 at point 42; alternatively a narrow tubular seal off extension can be used.

Prior to the peripheral bonding of the flanged portion of cover 16 to the container 4, electrolyte is introduced into the container by conventional impregnation techniques so as to provide the conduction medium for the device. The cover assembly 6 is readily produced by welding a flanged tantalum ring of one inch outer diameter and ⅜ inch inner diameter and a flange of ⅛ inch to a tungsten ring having a one-half inch outer diameter and a ¼ inch thinner diameter. The welding should be completely around the periphery of the tantalum and tungsten rings to produce an endless welded path about the center openings of the rings and thus prevent any creepage of the electrolyte between these two elements. A convolutely wound capacitor assembly of formed oxide coated tantalum anode foil and unetched, unformed tantalum cathode foil is provided with the anode tab welded to the internal lead wire of 25 mil diameter tantalum. The tantalum lead wire is electrically and mechanically bonded to a tungsten external lead wire 22 of similar dimensions. The cathode tab is welded to the flanged tantalum ring 16 as shown at 15. Junction region 24 between the internal and external lead, as well as the tungsten ring member and a portion of the flanged tantalum ring, are embedded in a hard glass by melting the glass on at a temperature of approximately 1100° C. This hard glass has a refractive index of 1.481, a softening point of 780° C., a density of 2.29 and is of a general class of borosilicates with silica content greater than 72%. The glass member 17 should have a thickness of about ⅜ inch. Such a borosilicate glass (Corning Glass type No. 3320) has temperature expansion characteristics substantially identical to that of tungsten. Prior to welding of the cover assembly 6 to the container 4, electrolyte 8 is introduced at point 18, thereafter the unit is sealed also at 18.

As indicative of the performance of this glass-to-metal seal, tantalum capacitors of 1 mfd., 150 volt rating were placed on voltage for one thousand hours in an atmosphere of 125° C. at the end of which the units showed substantially no increase in the initial leakage currents of less than $10^{-6}$ amperes.

As many apparently widely different embodiments of this invention may be made without departing from the spirit and scope hereof, it is to be understood that the invention is not limited to the specific embodiments hereof except as defined in the appended claims.

I claim:

1. A glass-to-metal endseal for electrolytic devices, comprising a metal wall member having an opening therethrough, a metal ring member welded to said wall member around said opening and extending inwardly therefrom to provide a reduced passageway, and a glass member completely encasing said ring member, said glass member and said ring member having substantially equal temperature coefficients of expansion.

2. A glass to metal closure for electrolytic devices which comprises an annular shaped valve metal wall, a non-valve metal ring bonded to said wall so as to define a passageway therethrough, a valve metal internal lead, a non-valve metal external lead joined to an end of said internal lead, said joint located in the passageway defined by said wall and said ring, and a glass member having the same temperature coefficient of expansion as said ring and said external lead, said member encasing said ring and said joint.

3. A hermetically sealed tantalum capacitor comprising a filmed tantalum anode fully immersed in an electrolyte, said electrolyte confined in a container, the end of said container enclosed by a flanged member of annular configuration, a ring member bonded to the inner peripheral edge of said flanged cover member, an external lead bonded to an internal lead disposed interiorly in said flanged annular cover member, a tantalum anode electrically connected to said internal lead, and a glass member fully enclosing said ring member, the junction region between said external lead and said internal lead, and the inner-peripheral section of said flanged annular cover member.

References Cited in the file of this patent

UNITED STATES PATENTS

| | | |
|---|---|---|
| 2,204,217 | Herringer | June 11, 1940 |
| 2,283,723 | Clark | May 19, 1942 |
| 2,285,136 | Abendroth | June 2, 1942 |
| 2,290,163 | Brennan | July 12, 1942 |
| 2,307,561 | Bailey | Jan. 5, 1943 |

UNITED STATES PATENT OFFICE
CERTIFICATE OF CORRECTION

Patent No. 2,907,933                                                  October 6, 1959

Mathew Nazzewski

It is hereby certified that error appears in the printed specification of the above numbered patent requiring correction and that the said Letters Patent should read as corrected below.

Column 4, line 52, for "tabe" read -- tab --; line 68, for "thinner" read -- inner --.

Signed and sealed this 5th day of April 1960.

(SEAL)
Attest:

KARL H. AXLINE
Attesting Officer

ROBERT C. WATSON
Commissioner of Patents